(12) United States Patent
Zu et al.

(10) Patent No.: US 8,338,008 B2
(45) Date of Patent: Dec. 25, 2012

(54) ELECTROLYTE COMPOSITIONS

(75) Inventors: Ge Zu, San Jose, CA (US); Majid Keshavarz, Pleasanton, CA (US)

(73) Assignee: Deeya Energy, Inc., Fremont, CA (US)

( * ) Notice: Subject to any disclaimer, the term of this patent is extended or adjusted under 35 U.S.C. 154(b) by 104 days.

(21) Appl. No.: 12/790,601

(22) Filed: May 28, 2010

(65) Prior Publication Data

US 2011/0076526 A1    Mar. 31, 2011

Related U.S. Application Data

(60) Provisional application No. 61/182,075, filed on May 28, 2009.

(51) Int. Cl.
    *H01M 2/38*    (2006.01)
(52) U.S. Cl. .......................................... 429/51; 429/50
(58) Field of Classification Search .......... 429/51
    See application file for complete search history.

(56) References Cited

U.S. PATENT DOCUMENTS

| | | |
|---|---|---|
| 3,540,934 A | 11/1970 | Boeke |
| 3,607,407 A | 9/1971 | Adams |
| 3,899,404 A | 8/1975 | Iverson |
| 3,996,064 A | 12/1976 | Thaller |
| 4,111,688 A | 9/1978 | Ichijo |
| 4,133,941 A | 1/1979 | Sheibley |
| 4,159,366 A | 6/1979 | Thaller |
| 4,308,324 A | 12/1981 | Newman |
| 4,309,372 A | 1/1982 | Sheibley |
| 4,312,735 A | 1/1982 | Grimes et al. |
| 4,414,090 A | 11/1983 | D'Agostino et al. |
| 4,454,649 A | 6/1984 | Jalan et al. |
| 4,468,441 A | 8/1984 | D'Agostino et al. |
| 4,485,154 A | 11/1984 | Remick et al. |
| 4,496,637 A | 1/1985 | Shimada et al. |
| 4,543,302 A | 9/1985 | Gahn et al. |
| 4,579,791 A | 4/1986 | Wang |
| 4,732,827 A | 3/1988 | Kaneko et al. |
| 4,784,924 A | 11/1988 | Savinell et al. |
| 4,814,241 A | 3/1989 | Nagashima et al. |
| 4,828,666 A | 5/1989 | Iizuka et al. |
| 4,874,483 A * | 10/1989 | Wakabayashi et al. ....... 205/506 |
| 4,882,241 A | 11/1989 | Heinzel |
| 4,894,294 A | 1/1990 | Ashizawa et al. |
| 4,929,325 A | 5/1990 | Bowen et al. |
| 4,945,019 A | 7/1990 | Bowen et al. |
| 4,948,681 A | 8/1990 | Zagrodnik et al. |
| 4,956,244 A | 9/1990 | Shimizu et al. |

(Continued)

FOREIGN PATENT DOCUMENTS

DE    102006007206    10/2006

(Continued)

OTHER PUBLICATIONS

International Search Report for related PCT Application No. PCT/US2010/036765, date of mailing Dec. 29, 2010.

(Continued)

*Primary Examiner* — Barbara Gilliam
*Assistant Examiner* — Gary Harris
(74) *Attorney, Agent, or Firm* — Haynes and Boone, LLP

(57) ABSTRACT

An electrolyte for a flow cell battery is provided. The electrolyte includes a concentration of chromium ions that is greater than the concentration of iron ions.

8 Claims, 1 Drawing Sheet

U.S. PATENT DOCUMENTS

| | | | |
|---|---|---|---|
| 5,009,868 A | 4/1991 | Spitz et al. |
| 5,061,578 A | 10/1991 | Kozuma et al. |
| 5,162,168 A | 11/1992 | Downing et al. |
| 5,188,911 A | 2/1993 | Downing et al. |
| 5,258,241 A | 11/1993 | Ledjeff et al. |
| 5,324,341 A | 6/1994 | Nagel et al. |
| 5,366,824 A | 11/1994 | Nozaki et al. |
| 5,403,675 A | 4/1995 | Ogata et al. |
| 5,648,184 A | 7/1997 | Inoue et al. |
| 5,656,390 A | 8/1997 | Kageyama et al. |
| 5,665,212 A | 9/1997 | Zhong et al. |
| 5,759,711 A | 6/1998 | Miyabayashi et al. |
| 5,851,694 A | 12/1998 | Miyabayashi et al. |
| 6,005,183 A | 12/1999 | Akai et al. |
| 6,040,075 A | 3/2000 | Adcock et al. |
| 6,077,622 A | 6/2000 | Minohara |
| 6,086,643 A | 7/2000 | Clark et al. |
| 6,461,772 B1 | 10/2002 | Miyake et al. |
| 6,475,661 B1 | 11/2002 | Pellegri et al. |
| 6,509,119 B1 | 1/2003 | Kobayashi et al. |
| 6,524,452 B1 | 2/2003 | Clark et al. |
| 6,555,267 B1 | 4/2003 | Broman et al. |
| 6,562,514 B1 | 5/2003 | Kazacos et al. |
| 6,692,862 B1 | 2/2004 | Zocchi |
| 6,759,158 B2 | 7/2004 | Tomazic |
| 6,761,945 B1 | 7/2004 | Adachi et al. |
| 6,764,789 B1 | 7/2004 | Sekiguchi et al. |
| 6,905,797 B2 | 6/2005 | Broman et al. |
| 6,986,966 B2 | 1/2006 | Clarke et al. |
| 7,061,205 B2 | 6/2006 | Shigematsu et al. |
| 7,078,123 B2 | 7/2006 | Kazacos et al. |
| 7,199,550 B2 | 4/2007 | Tsutsui et al. |
| 7,220,515 B2 | 5/2007 | Ito et al. |
| 7,227,275 B2 | 6/2007 | Hennessy et al. |
| 2003/0008203 A1 | 1/2003 | Winter |
| 2004/0170893 A1 | 9/2004 | Nakaishi et al. |
| 2004/0202915 A1 | 10/2004 | Nakaishi et al. |
| 2004/0241544 A1 | 12/2004 | Nakaishi et al. |
| 2005/0074653 A1 | 4/2005 | Broman et al. |
| 2005/0156431 A1 | 7/2005 | Hennessy |
| 2005/0156432 A1 | 7/2005 | Hennessy |
| 2005/0158615 A1 | 7/2005 | Samuel et al. |
| 2005/0164075 A1 | 7/2005 | Kumamoto et al. |
| 2005/0181273 A1 | 8/2005 | Deguchi et al. |
| 2005/0260473 A1 | 11/2005 | Wang |
| 2007/0072067 A1 | 3/2007 | Symons et al. |
| 2007/0080666 A1 | 4/2007 | Ritter et al. |
| 2007/0111089 A1 | 5/2007 | Swan |
| 2008/0081247 A1 | 4/2008 | Nakaishi et al. |
| 2008/0193828 A1 | 8/2008 | Sahu |
| 2009/0218984 A1 | 9/2009 | Parakulam |
| 2010/0003586 A1* | 1/2010 | Sahu ........................ 429/101 |
| 2010/0090651 A1 | 4/2010 | Sahu |
| 2010/0092757 A1 | 4/2010 | Nair |
| 2010/0092807 A1 | 4/2010 | Sahu |
| 2010/0092813 A1 | 4/2010 | Sahu |
| 2010/0092843 A1 | 4/2010 | Conway |
| 2010/0094468 A1 | 4/2010 | Sahu |
| 2010/0136455 A1 | 6/2010 | Winter |
| 2010/0143781 A1 | 6/2010 | Keshavarz |

FOREIGN PATENT DOCUMENTS

| | | |
|---|---|---|
| JP | 52155123 | 12/1977 |
| JP | 60047373 | 3/1985 |
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006114360 | 6/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | WO9003666 | 4/1990 |
| WO | 03005476 | 1/2003 |
| WO | 2004079849 | 9/2004 |
| WO | 2006135958 | 12/2006 |

OTHER PUBLICATIONS

Search Report for PCT Application No. PCT/US2009/049285.
Search Report for PCT Application No. PCT/US2009/066888.
Office Action for U.S. Appl. No. 12/217,059 mailed Aug. 23, 2010.
Office Action for U.S. Appl. No. 12/577,137 mailed Sep. 7, 2010.
Office Action for U.S. Appl. No. 12/631,749 mailed Aug. 19, 2010.

* cited by examiner

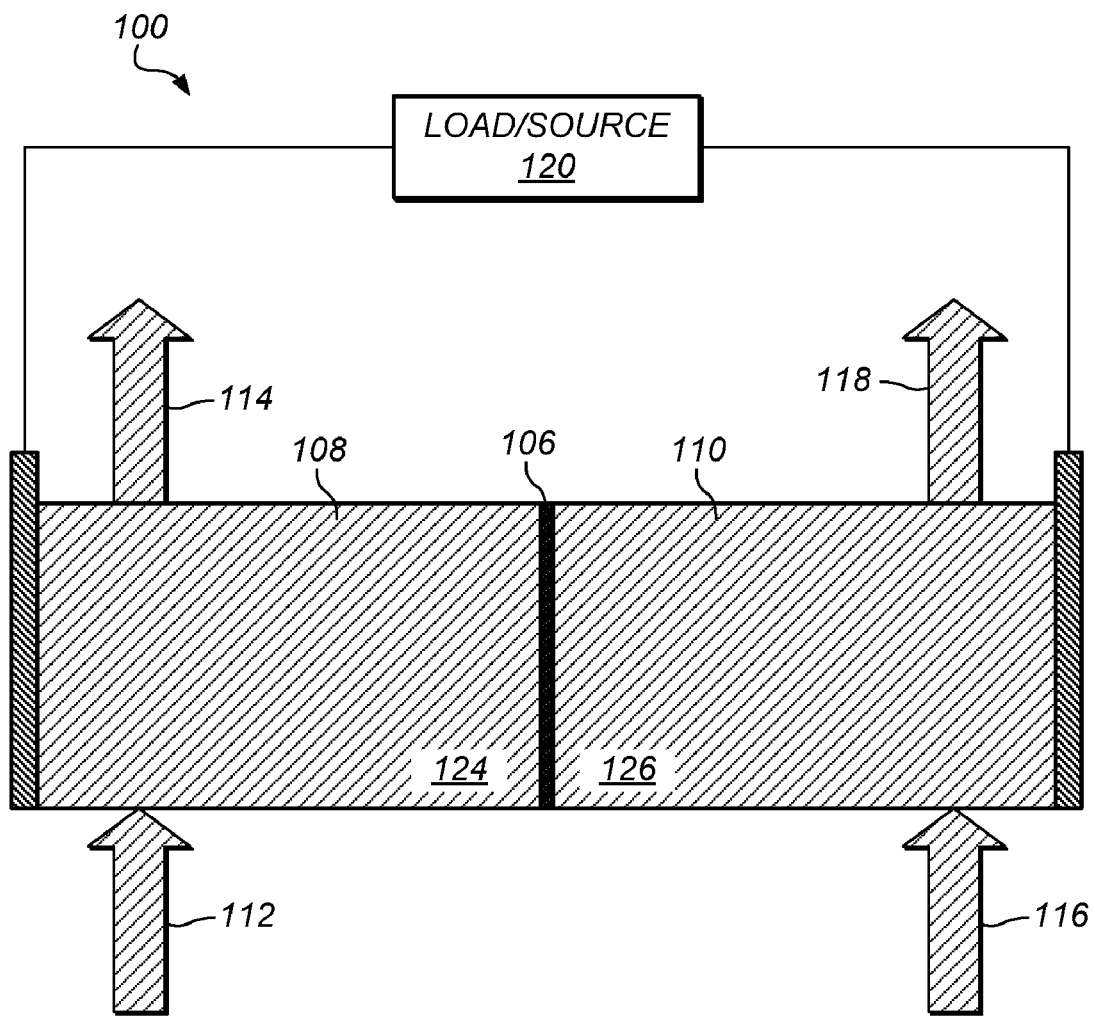

ELECTROLYTE COMPOSITIONS

PRIORITY CLAIM

This application claims the benefit of U.S. provisional application No. 61/182,075, entitled "Electrolyte Compositions" filed on May 28, 2009.

BACKGROUND OF THE INVENTION

1. Field of the Invention

The present disclosure relates to methods for formulating electrolytes and electrolyte solutions useful in reduction-oxidation (redox) flow batteries.

2. Description of the Relevant Art

There is an increasing demand for novel and innovative electric power storage systems. Redox batteries have become an attractive means for such energy storage. In certain applications, a redox flow battery may include positive and negative electrodes disposed in separate half-cell compartments. The two half-cell compartments may be separated by a porous or ion-selective membrane, through which ions are transferred during a redox reaction. Electrolytes (anolyte and catholyte) are flowed through the half-cells as the redox reaction occurs, often with an external pumping system. In this manner, the membrane in a flow cell battery operates in an aqueous electrolyte environment.

In some applications, an iron-ion containing aqueous hydrochloric acid solution may be used as the catholyte, while a chromium-ion containing aqueous hydrochloric acid solution may be used as the anolyte. In some applications, a mixture of chromium and iron containing solutions may be used on both sides of the redox flow battery. The use of mixed reactants substantially eliminates the requirement for a highly selective membrane since the composition of both half cells is identical in the discharged state.

There is a need for electrolytic solutions that enhance the useful reactions occurring in a flow cell battery, while minimizing side reactions.

SUMMARY OF THE INVENTION

In an embodiment, an electrolyte is disclosed that has a concentration of chromium ions that exceeds the concentration of iron ions.

In an embodiment, a redox flow cell includes a pair of electrodes disposed in separate half-cell compartments; a porous or ion-selective membrane separating the half-cell compartments; and an electrolyte that is flowed through the half-cell compartments. The electrolyte includes chromium ions and iron ions. The concentration of chromium ions, in some embodiments, is greater than the concentration of iron ions. The electrolyte may include $FeCl_2$ and/or $FeCl_3$ and $CrCl_3$ and/or $CrCl_2$ in aqueous HCl, wherein the total concentration of $CrCl_3$ and $CrCl_2$ is greater than the total concentration of $FeCl_2$ and $FeCl_3$. In some embodiments, the ratio of chromium ions to iron ions is in the range of about 1.1 to 10, or in the range of about 1.1 to 2.0.

In another embodiment, a method of reducing hydrogen production in an electrolyte flow cell, the electrolyte flow cell including a pair of electrodes disposed in separate half-cell compartments; a porous or ion-selective membrane separating the half-cell compartments; and an electrolyte that is flowed through the half-cell compartments, wherein the electrolyte includes chromium ions and iron ions. The method includes increasing the concentration of chromium in the electrolyte such the concentration of chromium in the electrolyte is greater than the concentration of iron.

BRIEF DESCRIPTION OF THE DRAWINGS

Advantages of the present invention will become apparent to those skilled in the art with the benefit of the following detailed description of embodiments and upon reference to the accompanying drawings in which:

FIG. 1 illustrates a redox flow cell.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular compositions or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise.

FIG. 1 illustrates a redox flow cell 100 of a redox flow battery according to some of the embodiments described herein. As shown, cell 100 includes two half-cells 108 and 110 separated by a membrane 106. An electrolyte 124 is flowed through half-cell 108 and an electrolyte 126 is flowed through half-cell 110. Half-cells 108 and 110 include electrodes 102 and 104 respectively, in contact with electrolytes 124 and 126, respectively, such that an anodic reaction occurs at the surface of one of electrodes 102 or 104 and a cathodic reaction occurs at the surface of the other one of electrodes 102 or 104. In some embodiments, multiple redox flow cells 100 can be electrically coupled (e.g., stacked) either in series to achieve higher voltage or in parallel in order to achieve higher current. As shown in FIG. 1, electrodes 102 and 104 are coupled across load/source 120, through which electrolytes 124 and 126 are either charged or discharged. The operation of a flow cell and the composition of a membrane is further described in U.S. patent application Ser. No. 12/217,059, entitled "Redox Flow Cell," filed on Jul. 1, 2008, which is incorporated herein by reference. Construction of a flow cell stack is described in U.S. patent application Ser. No. 12/577,134, entitled "Common Module Stack Component Design" filed on Oct. 9, 2009, which is incorporated herein by reference.

When filled with electrolyte, one half-cell (e.g., 108 or 110) of redox flow cell 100 contains anolyte 126 and the other half-cell contains catholyte 124, the anolyte and catholyte being collectively referred to as electrolytes. Reactant electrolytes may be stored in separate tanks and dispensed into the cells 108 and 110 via conduits coupled to cell inlet/outlet (I/O) ports 112, 114 and 116, 118 respectively, often using an external pumping system. Therefore, electrolyte 124 flows into half-cell 108 through inlet port 112 and out through outlet port 114 while electrolyte 126 flows into half-cell 110 through inlet port 116 and out of half-cell 110 through outlet port 118.

At least one electrode 102 and 104 in each half-cell 108 and 110 provides a surface on which the redox reaction takes place and from which charge is transferred. Suitable materials for preparing electrodes 102 and 104 generally include those known to persons of ordinary skill in the art. Examples of electrodes 102 and 104 are also described in U.S. patent application Ser. No. 12/576,235, entitled "Magnetic Current Collector" filed on Oct. 8, 2009, which is incorporated herein by reference. Redox flow cell 100 operates by changing the oxidation state of its constituents during charging or discharging. The two half-cells 108 and 110 are connected in series by the conductive electrolytes, one for anodic reaction and the other for cathodic reaction. In operation (i.e., charge or discharge), electrolytes 126 and 124 (i.e., anolyte or catholyte) are flowed through half-cells 108 and 110 through I/O ports 112, 114 and 116, 118 respectively as the redox reaction takes place. Power is provided to a load 120 or received from power source 120, depending on if the flow cell battery is in discharging or charging mode, respectively.

Typically, the charging and discharging of the redox flow battery results in a disparity of states of charge between the two electrolyte solutions. Parasitic side reactions competing with the reduction of certain ions and/or decomposition of charged species may result in the formation of unwanted side products. For example, in the case of acidic electrolytes, certain parasitic reactions may generate hydrogen. Therefore, there exists a need to increase the Columbic efficiency of redox battery by minimizing the parasitic side reactions during the charge/discharge cycles of the redox flow cell.

A non limiting, illustrative example of a redox pair would include:

$$Fe^{3+}+e^- \rightarrow Fe^{2+} (E_o=+0.771V)$$

$$Cr^{3+}+e^- \rightarrow Cr^{2+} (E_o=-0.407V)$$

where $E_o$ is the standard electrode potential of the reaction.

If the electrolyte has a net higher positive electrode potential ($E_o$) compared to a Standard Hydrogen Electrode (SHE) during discharge of the system, then the electrolyte is called the catholyte. The complementary electrolyte is then called the anolyte.

In a simple implementation of the redox cell technology, an acidic solution of $FeCl_2$ is on the cathode side and an acidic solution of $CrCl_3$ is on the anode side. Upon applying an appropriate positive voltage on the cathode with respect to the anode, i.e., during charging of the redox flow cell, the following reactions take place:

Cathodic reaction: $Fe^{2+} \rightarrow Fe^{3+}+e^-$

Anodic reaction: $Cr^{3+}+e^- \rightarrow Cr^{2+}$

Applying the external power supply affects an electron transfer, while a $Cl^-$ ion crosses the membrane from the anodic half-cell to the cathodic half-cell through the ion exchange membrane in order to preserve the charge balance. In the ideal situation, the fully charged redox flow cell consists of 100% $FeCl_3$ solution on the cathode side and 100% $CrCl_2$ solution on the anode side.

When the external power supply is replaced with a load, the cell begins to discharge, and the opposite redox reactions take place:

Cathodic reaction: $Fe^{3+}+e^- \rightarrow Fe^{2+}$

Anodic reaction: $Cr^{2+} \rightarrow Cr^{3+}+e^-$

Therefore, in the most ideal situation, the fully discharged flow cell consists of 100% $FeCl_2$ solution on the cathode side and 100% $CrCl_3$ solution on the anode side.

A variation of the Cr/Fe system described above is a redox cell with premixed Fe and Cr solutions. Since no membrane is perfectly perm-selective, anolyte and catholyte eventually become cross-mixed over many cycles of charge and discharge, in a system such as described above, thus reducing the net system capacity. A remedy to this was to use a mixed Fe and Cr solution, in a 1:1 proportion, as both the anolyte and the catholyte. In the completely charged state, the anolyte includes $CrCl_2$ and $FeCl_2$ in a 1:1 proportion and the catholyte comprises $FeCl_3$ and $CrCl_3$ in a 1:1 proportion. In this way, any cross-diffusion of species merely appears as a Coulombic inefficiency, and over time the 1:1 charge balance is maintained. Although the above example describes a Cr/Fe system, it is generally applicable to other redox pairs.

One of the major problems of such redox flow cells is maintaining the charge balance between the anodic and cathodic sides of the cell. If there are no parasitic reactions other than the fundamental redox reactions, then the two sides are always in a charge balanced state. However, in reality parasitic reactions do occur, and after many cycles of charge and discharge, a marked difference with respect to the state of charge of the two electrolyte solutions may develop. Using the Cr/Fe system as a non limiting example, under ideal conditions (i.e. no parasitic reactions occur) for every $Fe^{3+}$ ion in the cathode tank there is a $Cr^{2+}$ ion in the anode tank, and for every $Fe^{2+}$ ion in the cathode tank, there is a $Cr^{3+}$ ion in the anode tank. However, in practice, during the charging process, though $Fe^{2+}$ oxidation proceeds with nearly 100% current yield, reduction of $Cr^{3+}$ generates hydrogen as a side reaction on the graphite electrodes, resulting in a higher state of charge of the iron electrolyte, i.e. in an excess of $Fe^{3+}$ ions. Other examples of parasitic reactions include, oxygen (internal or external to the system) oxidizing $Fe^{2+}$ to $Fe^{3+}$, or $Cr^{2+}$ to $Cr^{3+}$; $Cr^{2+}$ reducing water to become $Cr^{3+}$; or during charging, hydrogen generation on the anode in competition with $Cr^{3+}$ reduction, while $Fe^{2+}$ oxidation takes place on the cathode.

There are many factors responsible for the generation of hydrogen gas on the chromium half-cell side, including but not limited to: state of charge ("SOC"), molar concentration of $Cr^{2+}$, temperature, formulation and acid concentration, impurities and catalysts, electrode and electrode surface, flow rate, etc. Hydrogen gas can be produced upon reduction of $H^+$ on the chromium half-cell side (negative side). Hydrogen gas can be produced either directly at the electrode by $H^+$ competing with reduction of $Cr^{3+}$, or alternatively, it can be produced indirectly by reduction of $H^+$ by $Cr^{2+}$ ions. Those processes are reflected by the following:

$$Cr^{3+}+e^- \rightarrow Cr^{2+}$$

$$H^++e^- \rightarrow \tfrac{1}{2}H_2$$

$$Cr^{2+}+H^+ \rightarrow Cr^{3+}+\tfrac{1}{2}H_2$$

The charge capacity of the system is dependent on a number of factors. For example the volume of electrolyte solution can be selected to provide a wide range of charge capacity to the system. The more electrolyte that is available for the cell, the greater the capacity of the cell. Because of the chemical reactions within the cells, the capacity of a redox flow cell depends on the discharge conditions such as the magnitude of the current (which may vary with time), the allowable terminal voltage of the battery, temperature and other factors. For example, if a battery is discharged at a relatively high rate, the available capacity will be lower than expected. While the volume of electrolyte can be varied to meet the desired capacity, having large volumes of electrolytes can create problems in handling and storage for the flow cell battery.

In order to minimize the volume of electrolytes, it is desirable to have the electrolyte solution at as high a concentration as the electrolyte solution will allow under most operating conditions. For a Cr/Fe system, an electrolyte solution may include hydrochloric acid. Since the discharge of the cell occurs with reduction of $Fe^{3+}$ to $Fe^{2+}$, the concentration of $Fe^{3+}$ available in the cell, after charging, has a significant effect on the charge capacity. To protect against parasitic reactions which, ultimately, lower the amount of available $Fe^{3+}$ after each cycle, one approach would be to increase the amount of Fe with respect to Cr to extend the life of the battery. This method, however, does not stop the parasitic reactions, it simply compensates for them.

One factor responsible for $H_2$ generation is the concentration of charged species in the solution on the negative side, as the ratio of $Cr^{2+}/Cr^{3+}$ increases the $H_2$ generation increases. In an embodiment, the $Cr^{2+}/Cr^{3+}$ ratio may be kept low by increasing the Cr content in the electrolyte. For example, reduction of hydrogen generation may be accomplished by increasing the Cr:Fe ratio. In a balanced electrolyte solution the Cr:Fe ratio is 1. Reduced hydrogen production, however, may be accomplished if the Cr:Fe ratio is in the range of 1.1 to 10, or 1.1 to 5, or 1.1 to 4, or 1.1 to 3, or 1.1 to 2. Ratio is greater than 1.1, greater than 1.5, or greater than 2.

Increasing the amount of Cr with respect to the amount of Fe reduces the amount of hydrogen gas produced. For example, in Table 1 two electrolyte solutions were compared. In Solution A, the relative molar concentration of chromium was 1.25 and the relative molar concentration of iron was 1.4, giving a Cr:Fe ratio of about 0.9. Solution B includes a relative molar concentration of chromium of 1.5 and a relative molar concentration of iron of 1.0, giving a Cr:Fe ratio of 1.5 When tested in typical flow cell conditions the relative amount of $H_2$ gas produced hour was significantly reduced in the electrolyte solution that included more chromium than hydrogen. Additionally, the relative amount of $H_2$ gas produced per charge/discharge cycle was also significantly reduced in the electrolyte solution that included more chromium than iron

TABLE 1

| | Relative $H_2$ generated per hour | Relative $H_2$ generated per cycle |
|---|---|---|
| Solution A Cr:Fe = 0.9 | 5.31 | 5.62 |
| Solution B Cr:Fe = 1.5 | 1 | 1 |

As can be seen from Table 1, the increase in chromium, relative to the amount of iron present in the electrolyte causes a substantial decrease in hydrogen production. Increasing the Cr:Fe ratio further will further decrease the hydrogen production.

The molar concentration of the electrolyte solution is somewhat controlled by the relative solubility of each of the components in the electrolyte medium. For example, in Cr/Fe systems, the most commonly used species are $CrCl_2/CrCl_3$ and $FeCl_2/FeCl_3$ species. These species are typically dissolved in hydrochloric acid. The total amount of Cr and Fe that can be dissolved in HCl, having a given concentration, is generally consistent, regardless of the ratio of Cr to Fe. Thus as the amount of Cr is increased, the amount of Fe present may need to be decreased in order to properly solubilized the components of the electrolyte solution. Thus the ratio of Cr:Fe is selected such that the hydrogen production is reduced, while sufficient energy is available based on the amount of iron species present. It has been found that this is best met, in Cr/Fe systems, when the ratio of Cr to Fe is between 1.1. to 2.0.

In a 1.0M $FeCl_2/1.0M$ $CrCl_3$ solution, the concentration of $Fe^{3+}$ on the positive side, at 50% state of charge ("SOC"), would be 50%, and concentration of $Cr^{2+}$ on the negative side would be 50% as well, assuming there are no side reactions. Whereas, in 1.0M $FeCl_2/2.0M$ $CrCl_3$ solution, the concentration of $Fe^{3+}$ on the positive side, at 50% state of charge, would be still 50%, but the concentration of $Cr^{2+}$ on the negative side would be only 25%. Theoretically, the Ah capacity of the system is identical in both formulations, but due to lower $Cr^{2+}/Cr^{3+}$ ratio, the $H_2$ generation decreases and columbic efficiency increases significantly. The SOC of each half-cell for different formulations is tabulated in Table 2. For example, in some embodiments, the hydrogen generation is decreased by a factor five when a flow cell cycled (charged/discharged) with 1.5M $CrCl_3/1.0M$ $FeCl_2$ in 2.5M HCl is compared with 1.0M $CrCl_3/1.0M$ $FeCl_2$ in 2.5 M HCl under identical conditions.

TABLE 2

| Cr/Fe ratio 1/1 | | Cr/Fe ratio 1.5/1 | | Cr/Fe ratio 2/1 | |
|---|---|---|---|---|---|
| Cr, SOC % | Fe, SOC % | Cr, SOC % | Fe, SOC % | Cr, SOC % | Fe, SOC % |
| 5 | 5 | 3.3 | 5 | 2.5 | 5 |
| 10 | 10 | 6.7 | 10 | 5.0 | 10 |
| 20 | 20 | 13.3 | 20 | 10.0 | 20 |
| 30 | 30 | 20.0 | 30 | 15.0 | 30 |
| 40 | 40 | 26.7 | 40 | 20.0 | 40 |
| 50 | 50 | 33.3 | 50 | 25.0 | 50 |
| 60 | 60 | 40.0 | 60 | 30.0 | 60 |
| 70 | 70 | 46.7 | 70 | 35.0 | 70 |
| 80 | 80 | 53.3 | 80 | 40.0 | 80 |
| 90 | 90 | 60.0 | 90 | 45.0 | 90 |
| 95 | 95 | 63.3 | 95 | 47.5 | 95 |

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A redox flow cell comprising:
a pair of electrodes disposed in separate half-cell compartments;
a porous or ion-selective membrane separating the half-cell compartments; and an
electrolyte that is flowed through the half-cell compartments, wherein the electrolyte comprises $FeCl_2$ and/or $FeCl_3$ and $CrCl_3$ and/or $CrCl_2$ in aqueous HCl,
wherein a concentration of chromium ions from $CrCl_3$ and $CrCl_2$ is greater than a concentration of iron ions from $FeCl_2$ and $FeCl_3$, and a ratio of the concentration of chromium ions to the ratio of iron ions is greater than about 1.1.

2. The redox flow cell of claim 1, wherein the ratio of chromium ions to iron ions is between 1.1 to 10.

3. The redox flow cell of claim 1, wherein the ratio of chromium ions to iron ions is greater than about 1.1.

4. The redox flow cell of claim 1, wherein the ratio of chromium ions to iron ions is between 1.1 and 2.0.

5. A method of reducing hydrogen production in a redox flow cell, the redox flow cell comprising a pair of electrodes disposed in separate half-cell compartments; a porous or ion-selective membrane separating the half-cell compartments; and an electrolyte that is flowed through the half-cell compartments,
wherein the electrolyte comprises $FeCl_2$ and/or $FeCl_3$ and $CrCl_3$ and/or $CrCl_2$ in aqueous HCl, the method comprising: increasing a total concentration of chromium ions from $CrCl_3$ and/or $CrCl_2$ in the electrolyte such that the total concentration of chromium ions from $CrCl_3$ and/or $CrCl_2$ in the electrolyte is greater than a total concentration of iron ions from $FeCl_2$ and $FeCl_3$, and a ratio of the concentration of chromium ions to the ratio of iron ions is greater than about 1.1.

6. The method of claim 5, wherein the ratio of chromium ions to iron ions is between 1.1 to 10.

7. The method of claim 5, wherein the ratio of chromium ions to iron ions is greater than about 1.1.

8. The method of claim 5, wherein the ratio of chromium ions to iron ions is between 1.1 and 2.0.

* * * * *